April 10, 1973  D. T. BRAY  3,726,793
REVERSE OSMOSIS WATER PURIFYING SYSTEM WITH GRADIENT
BARRIER WATER STORAGE CONTAINER
Filed May 3, 1971
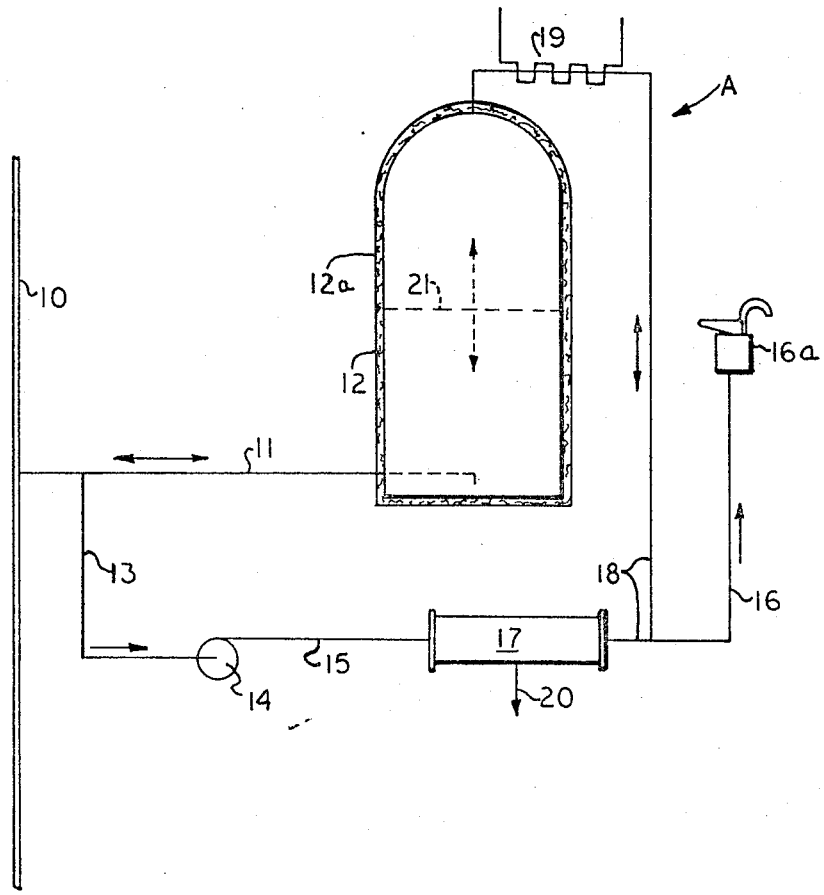
INVENTOR.
DONALD T. BRAY
BY
ATTORNEY United States Patent Office 3,726,793
Patented Apr. 10, 1973

3,726,793
REVERSE OSMOSIS WATER PURIFYING SYSTEM WITH GRADIENT BARRIER WATER STORAGE CONTAINER
Donald T. Bray, Escondido, Calif., assignor to Desalination Systems, Inc., Escondido, Calif.
Filed May 3, 1971, Ser. No. 139,563
Int. Cl. B01d 13/00, 31/00
U.S. Cl. 210—23
10 Claims

ABSTRACT OF THE DISCLOSURE

In a water purification system wherein pressurized feed water is fed to the bottom of a storage container, and also to the inlet of a pressure pump, and supply water from the pump is fed at increased pressure to the inlet of the reverse osmosis unit, purified product water from the latter unit is fed to a dispensing valve or faucet, and also is heated and fed to the upper end of the product water storage container. The heated product water entering at the top of the storage container has a lower density and tends to float on the colder feed water in the product water storage tank. In addition, the purified water entering the top of the storage container has a lower salt content and less density than the colder feed water. Both mechanisms serve to create a density gradient barrier at the interface between product water and the feed water, thereby tending to keep the two water layers separate. The storage container preferably is insulated to maintain the relative temperatures of the two waters and to reduce the creation of convection currents.

BACKGROUND OF THE INVENTION

One prior type of purified product water container for a small reverse osmosis water purification system comprises a tank having a flexible, impervious diaphragm separating purified product water from pressurized feed water, the latter providing pressure necessary for dispensing the product water. Such a storage container is disclosed in U.S. Pat. No. 3,493,496 and while such storage container is effective for its purpose, when the supply of product water is exhausted, due to the presence of the diaphragm, no more water can be drawn from the dispensing means until a fresh supply of purified water has been produced. Where this type of reverse osmosis unit is used to supply water to a beverage dispenser, such as, for example, one of the well known hot drink or carbonated beverage dispensers, such shutting off of the water supply upon exhaustion of purified product water is not satisfactory, and it is preferable to use untreated feed water in the event that the supply of purified water is used up.

Another prior type of product water storage container is disclosed in my U.S. patent application, Ser. No. 864,764, filed Oct. 8, 1969, now Pat. No. 3,616,921, which storage container, upon the exhaustion of the stored product water, supplies untreated feed water. However, the storage container of this application comprises one or more long passages of small cross sectional area, which may call for a more expensive construction than with a simple, open tank, and also may present a cleaning problem with some waters.

PURPOSE OF THE INVENTION

A primary objective of the present invention is to provide a reverse osmosis water purification system with a simple, easily cleansed storage container wherein a temperature gradient barrier is created at the interface between purified product water and feed water to minimize intermingling of these waters in the container. A further objective of the invention is to provide a product water storage container for a reverse osmosis water purification system which supplies warmer product water to the upper end of such container and openly connects the lower end of the product water container to a line containing pressurized feed water. A pump produces pressure for the reverse osmosis process, and forces the warmed, purified water into the storage container, thereby moving the interface between the two waters downwardly during the times in which a dispensing valve is closed, the interface moving upwardly during such times as the dispensing valve is open.

BRIEF DESCRIPTION OF THE DRAWING

The foregoing objectives and advantages of the invention will be apparent from the following description and the accompanying drawing, wherein the single figure is a diagrammatic illustration of a reverse osmosis water purification system having a product water storage container embodying the invention.

DETAILED DESCRIPTION OF THE DRAWING

Referring to the drawing in detail, a reverse osmosis water purification system A comprises a feed water supply pipe 10 such as the cold water supply line in a building in which a system embodying the invention is installed. This supply pipe 10 is connected to a usual source of pressurized feed water, such as the mains of a municipal water company or department. A line 11 from the feed water supply pipe 10 is connected to discharge with minimum turbulence into the lower end portion of a water storage container 12, which preferably is a vertically elongate tank. The specific shape of the storage container 12, is however, not a feature of the invention. A line 13 also connects the feed water pipe 10 to the inlet of a conventional water pressure pump 14, the outlet of which is connected by a line 15 to the feed water inlet of a conventional reverse osmosis water purification unit 17. The latter unit may be of any suitable type, such as that shown, for example, in U.S. Pat. No. 3,504,796, or U.S. Pat. No. 3,542,203, both of which patents are assigned to the assignee of the present invention.

The product water outlet of the reverse osmosis unit 17 is connected by a line 18 to discharge purified product water into the upper end of the storage container 12. Means are provided for maintaining the temperature of the product water in the top of the storage container 12, at a temperature slightly above that of the feed water supplied to the lower end or bottom of storage container 12 from the supply pipe 10, and the container 12 preferably is insulated by a jacket 12a of fiber glass mat or other suitable heat insulative material so that the difference in temperature between the feed and product waters will be maintained in the storage container.

The required temperature increase may be imparted to the incoming product water by a low wattage electric heating unit 19, although in some cases the heat produced by the work performed by the pump 14 may be sufficient. In any event the increase in temperature need be only slight, for example up to the order of a few degrees above the temperature of the feed water, in order to maintain the temperature gradient barrier between the two waters in the container 12. A line 16 communicates a dispensing valve or faucet 16a with the product water outlet of the reverse osmosis unit 17, and also with the top of the storage container 12. A usual blowdown line 20 from the reverse osmosis unit 17 disposes of the small amount of feed water which flows across the high pressure face of the usual membrane of the unit 17 through which membrane the water is forced in order to remove impurities collecting on such face during the reverse osmosis process. This blowdown water may be disposed of either to a waste drain, such as a sewer, or to a feed water or other pipe as disclosed in my U.S. patent application Ser. No. 116,109, filed Feb. 17, 1971.

OPERATION

With the reverse osmosis system A installed substantially as illustrated and described herein, the system is placed in operation by admitting pressurized feed water from the feed water supply pipe 10 to the lines 11 and 12, energizing the pump 14, and, where provided, the heater 19. As mentioned previously herein, a supplemental heater may not be required. Feed water flows rapidly into the bottom of the storage container 12, filling it, and then flows on through the lines 18, and 16, filling them also. It is advisable, during this initial filling of the system, to provide a vent by opening and leaving open the dispensing faucet 16a, until the air is vented from the system.

At the same time, feed water from the line 10 flows through line 13 and is forced by the pump 14 through the reverse osmosis unit 17, and thence on into the line 18. With the storage container and all lines filled, the system is ready for operation, and, upon closing the dispensing valve or faucet 16a, the increased pressure imparted by the pump 14 forces product water, as produced, through the line 18, past the heater 19 where it is warmed to required temperature, and on into the storage container 12.

The flow of product water is relatively slow, although this flow will vary of course with the size and capacity of the unit employed. The heated purified product water entering the storage container 12, in addition to being inherently of lower specific gravity than the saline feed water, due to the lower amount of dissolved salts and being additionally expanded by the heat creates a gradient barrier at the interface between the two waters in the container 12 represented by the broken line 21 in the drawing. Thus storage container 12 may be considered an open conduit in the sense that flow therethrough is not shut off by the presence of any solid divider or diaphragm; separation between the feed and product water layers being obtained by the presence of gradient barrier as described above and as illustrated specifically in the drawing at 21.

When the dispensing valve or faucet 16a is opened, pressure in the lines 16 and 18 drops below that of the feed water, and water is drawn from the storage container through the dispensing faucet 16a. Thereupon the gradient barrier interface 21 moves upwardly in the container 12, and in the event that the supply of purified product water in the container 12 and lines 16 and 18 is exhausted, the untreated feed water automatically follows the purified water through the dispensing valve or faucet 16a as required. The feed water is of course potable, since it comes from the usual drinking supply of a municipal water system, even though it does not taste as good as the purified water. As soon as the dispensing valve or facet is closed, the purification and water storage procedure resumes as described previously herein.

The invention provides simple, inexpensive product water storage means for a reverse osmosis water purification system wherein the difference in density between the feed and product water provides a gradient barrier between the two waters, and one wherein, upon exhaustion of the supply of purified product water, untreated supply water is automatically dispensed.

Having thus described my invention, what I claim as new and useful and desire to protect by U.S. Letters Patent is:

1. Water purification and storage apparatus comprising a reverse osmosis water purification unit, means for supplying pressurized feed water at a pressure above atmospheric to a pump which supplies said feed water to said purification unit at a pressure higher than said feed water supply pressure, and a container in which purified water produced by said purification unit is temporarily stored, in which the improvement comprises:

(a) said container comprising an open conduit;
   (b) a pipe connecting the said pressurized feed water supply into the lower end of said container;
   (c) means connecting the purified water outlet of said purification unit to supply purified water into the top of said container;
   (d) purified water dispensing means connected to the top of said container; and
   (e) means for maintaining the temperature of the purified water inside said container at a temperature higher than the temperature of the feed water inside said container, thereby to form a gradient barrier between the layers of said purified water and said feed water in said container.

2. Apparatus according to claim 1 in which said means for maintaining the temperature of the purified water in said container higher than the temperature of the feed water inside said container comprises the pump which supplies said feed water to said purification unit at a pressure higher than said feed water supply pressure and which heats purified water supplied to the top of said container during work performed in raising the pressure of the feed water supplied to the said purification unit.

3. Apparatus according to claim 1 in which said means for maintaining the temperature of the purified water in said container higher than the temperature of the feed water inside said container comprises electrical heating means adapted to heat the purified water supplied to the top of said container.

4. Apparatus according to claim 1 in which said means for maintaining the temperature of the purified water inside said container higher than the temperature of the feed water therein has a capacity for heating the purified water to a temperature of the order of a few degrees above the temperature of the feed water.

5. Apparatus according to claim 1 in which said container comprises a vertically elongate, thermally insulated tank.

6. A method for storing purified water in a container under pressure for delivery from the top of said container to dispensing means, which comprises:

(a) introducing pressurized feed water, employed as feed water for a purification unit to produce said purified water, into the lower end of said container;
   (b) introducing said purified water into the top of said container; and
   (c) maintaining the said purified water in said container at a temperature above the temperature of the feed water in said container thereby to form a gradient barrier between the layers of said purified water and feed water in said container.

7. A method according to claim 6 in which said purified water in said container is heated before introduction into said container.

8. A method according to claim 7 in which said purified water is heated to a temperature of the order of a few degrees above the temperature of the feed water.

9. A method according to claim 6 in which said purified water in said container is heated before introduction into said container by work performed by a pump introducing said feed water into said purification unit under elevated pressure.

10. A method according to claim 6 in which thermal insulation is employed as a jacket around said container to maintain the temperature difference between the layers of said feed water and said purified water in said container.

References Cited

UNITED STATES PATENTS 3,630,378  12/1971  Bauman _____ 210—257
3,549,522  12/1970  Hye et al. _____ 210—23

FRANK A. SPEAR, JR., Primary Examiner

U.S. Cl. X.R.

210—181, 257, 321